United States Patent
Hitchcock et al.

(10) Patent No.: US 7,596,779 B2
(45) Date of Patent: *Sep. 29, 2009

(54) CONDITION MANAGEMENT CALLBACK SYSTEM AND METHOD OF OPERATION THEREOF

(75) Inventors: Russell Hitchcock, Morris Plains, NJ (US); Michael A. Holmes, Hillsborough, NJ (US); Keith Kahn, Jersey City, NJ (US); Gerald S. Williams, Macungie, PA (US)

(73) Assignee: Agere Systems Inc., Allentown, PA (US)

( * ) Notice: Subject to any disclaimer, the term of this patent is extended or adjusted under 35 U.S.C. 154(b) by 771 days.

This patent is subject to a terminal disclaimer.

(21) Appl. No.: 10/782,080

(22) Filed: Feb. 19, 2004

(65) Prior Publication Data

US 2005/0188140 A1 Aug. 25, 2005

(51) Int. Cl.
*G06F 9/44* (2006.01)
*G06F 13/24* (2006.01)
(52) U.S. Cl. .................. 717/127; 710/260; 712/244
(58) Field of Classification Search ............... 717/116, 717/127
See application file for complete search history.

(56) References Cited

U.S. PATENT DOCUMENTS

| | | | | |
|---|---|---|---|---|
| 5,371,742 A * | 12/1994 | Brown et al. | ............ | 714/2 |
| 5,495,615 A * | 2/1996 | Nizar et al. | ............ | 710/260 |
| 5,530,874 A * | 6/1996 | Emery et al. | ............ | 710/262 |
| 5,535,420 A * | 7/1996 | Kardach et al. | ............ | 710/48 |
| 5,568,644 A * | 10/1996 | Nelson et al. | ............ | 710/268 |
| 5,903,894 A * | 5/1999 | Reneris | ............ | 707/100 |
| 5,995,736 A * | 11/1999 | Aleksic et al. | ............ | 716/18 |
| 6,070,219 A * | 5/2000 | McAlpine et al. | ............ | 710/263 |
| 6,119,194 A * | 9/2000 | Miranda et al. | ............ | 710/306 |
| 6,253,370 B1 * | 6/2001 | Abadi et al. | ............ | 717/154 |
| 6,292,855 B1 * | 9/2001 | Johnson et al. | ............ | 710/33 |
| 6,584,532 B1 * | 6/2003 | Francis et al. | ............ | 710/264 |
| 6,615,342 B1 * | 9/2003 | Bopardikar et al. | ............ | 712/227 |
| 6,704,823 B1 * | 3/2004 | Perez et al. | ............ | 710/260 |
| 6,883,053 B2 * | 4/2005 | Shinagawa et al. | ............ | 710/263 |
| 2002/0112180 A1 * | 8/2002 | Land et al. | ............ | 713/200 |

OTHER PUBLICATIONS

Silberschatz and Galvin, "Operating System Concepts", Dec. 1997, Addison-Wesley, 5th Edition, ISBN 0-201-59113-8, Chapter 8.*

* cited by examiner

*Primary Examiner*—James Rutten (57) ABSTRACT

A condition management callback system and method for use with a processor employing a hierarchical register consolidation structure. In one embodiment, the system includes: (1) a condition management structure, (2) a callback abstraction subsystem configured to register a callback for at least one element object in the condition management structure and store logically abstracted data associated with the callback and (3) an abstraction retrieval subsystem configured to employ the condition management structure to determine a condition of at least one status indicator in the condition management structure by traversing the hierarchical register consolidation structure, initiate the callback based on the condition and pass the logically abstracted data if the element object representing the status indicator has the callback registered.

20 Claims, 4 Drawing Sheets

CONDITION MANAGEMENT CALLBACK SYSTEM AND METHOD OF OPERATION THEREOF

CROSS-REFERENCE TO RELATED APPLICATION

This application is related to U.S. patent application Ser. No. 10/612,097, now issued as U.S. Pat. No. 7,389,496 entitled "A Condition Management System and Method of Operation Thereof" to Eckhart, et al., filed on Jul. 2, 2003, which is commonly assigned with the present invention and incorporated herein by reference as if reproduced herein in its entirety.

TECHNICAL FIELD OF THE INVENTION

The present invention is directed, in general, to processors and, more specifically, to a condition management callback system for use with a processor and a method of operation of a condition management callback system.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND OF THE INVENTION

Computer systems perform wide-ranging tasks in today's world, to say the least. In performing many of these tasks, computers are called upon to determine the condition of and control external devices. These external devices may be of many different types, including sensors, clocks, actuators, disk drives and motors to name just a few.

A computer typically interacts with external devices by executing a software program that calls for the computer to generate signals that control certain of the devices based on the condition of other of the devices. For example, a computer may adjust the speed of a motor based on the temperature of a fluid that the motor is stirring and the length of time that the motor has been stirring the fluid.

When computers began to be called upon to sense and control external devices, a method called "polling" was developed. Polling calls for the computer actively to query the external devices to determine their condition, usually periodically. In the example above, the computer may poll a thermometer and a clock once a second to determine the fluid temperature and time. While effective for simple tasks involving a relatively small number of devices, polling came to consume ever-greater amounts of the computer's time as the tasks and the numbers of devices became more complex. Polling is inefficient, because the computer must poll even when no conditions requiring the computer's response have occurred. At its extreme, polling may even consume so much time that the computer is precluded from performing other tasks.

To overcome the disadvantages inherent in polling, "interrupts" were developed. With interrupts, the computer does not actively determine the condition of external devices. Instead, changes in device condition ("events") cause signals ("interrupts") to be delivered to the computer, often by way of an "interrupt register," or "alarm register," that contains status information regarding its corresponding external device. The computer is free to execute its software program until it receives an interrupt, at which time it usually departs from its program and responds to, or "handles," the interrupt, often based on the contents of one or more interrupt registers.

Interrupts are widely used today, but they are by no means a perfect solution. Interrupt handling becomes complex when a computer is called upon to sense and control a great number of external devices. It becomes more complex when combinations of events trigger different responses by the computer. It becomes still more complex when the events and combinations change depending upon the software instructions that the computer is executing when the events or combinations occur. Combinations of interrupt conditions have become so complex that they are now often organized into a "hierarchical register consolidation structure" to ease their management.

Overlying all of the potential complexity described above is that a given software program may have to function on many computers in many different environments, each with its own combination of external devices and distinctive register consolidation structure. This variability requires each software program to be configured to each environment, making software development and installation more complex, time-consuming, expensive and error-prone. Accordingly, what is needed in the art is a better way to manage interrupts, particularly in a complex, hierarchical environment.

SUMMARY OF THE INVENTION

To address the above-discussed deficiencies of the prior art, the present invention provides a condition management callback system and method for use with a processor employing a hierarchical register consolidation structure.

In one embodiment, the system includes: (1) a condition management structure containing groups of status indicators associated with the hierarchical register consolidation structure logically abstracted into a tree of hierarchical container objects and element objects, each of the container objects associated with at least one of the element objects and linked to a single parent object, each of the element objects representing at least one of the status indicators and linked to a single child object, (2) a callback abstraction subsystem configured to register a callback for one of the element objects and store logically abstracted data associated with the callback and (3) an abstraction retrieval subsystem configured to employ the condition management structure to determine a condition of at least one of the status indicators by traversing the hierarchical register consolidation structure, initiate the callback based on the condition and pass the logically abstracted data if one of the element objects representing at least one of the status indicators has the callback registered.

In one embodiment, the method includes: (1) abstracting groups of status indicators associated with the hierarchical register consolidation structure into a tree of hierarchical container objects and element objects to form a condition management structure, each of the container objects associated with at least one of the element objects and linked to a single parent object, each of the element objects representing at least one of the status indicators and linked to a single child object, (2) registering a callback for one of the element objects, (3) storing logically abstracted data associated with the callback, (4) employing the condition management structure to determine a condition of at least one of the status indicators by traversing the hierarchical register consolidation structure, (5) initiating the callback based on the condition and (6) passing the logically abstracted data if one of the element objects representing at least one of the status indicators has the callback registered.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
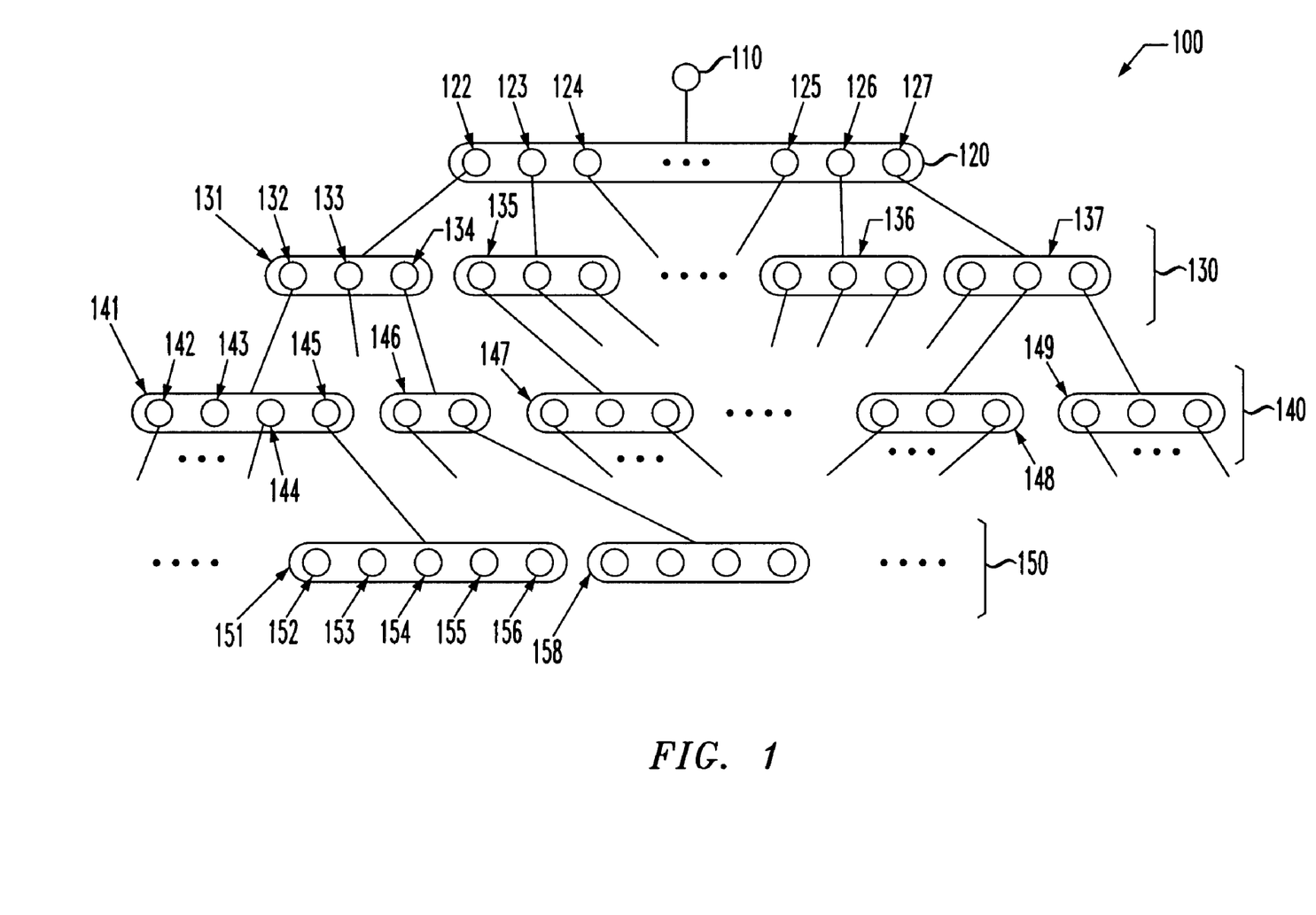
FIG. 1 a schematic diagram of an exemplary hierarchical register consolidation structure.

Referring initially to FIG. 1, illustrated is a schematic diagram of an example of a hierarchical register consolidation structure, generally designated 100, of a processor that may be employed by the present invention. The hierarchical register consolidation structure 100 has a structure similar to a tree structure having branches and leaves.

The lowest level of registers (leaves) in the hierarchical register consolidation structure 100 contains source-level interrupts 150. In the illustrated embodiment, the source-level interrupts 150 handle all of the alarms or events associated with the physical circuitry of or connected to the processor. The source-level interrupts 150 include a plurality of alarm registers 151, 158. The alarm registers 151, 158 are typically a "write-1-clear" register having bits 152-156 for each alarm (or event) associated therewith. A "write-1-clear" register latches each of the alarm bits, such as the alarm bits 152-156, until cleared. Also, one skilled in the pertinent art should know that the alarm registers 151, 158 may have any number of alarm bits and the hierarchical register consolidation structure 100 may have any number of alarm registers.

Associated with each of the alarm registers 151, 158 are interrupt mask registers (not shown) that contain corresponding interrupt mask bits for each of the alarm bits (152-156) in the alarm registers 151, 158. An interrupt mask bit determines if its corresponding alarm bit can contribute to an interrupt. For example, if the alarm bit 154 of the alarm register 151 is set (or in alarm condition) and if the interrupt mask bit that corresponds to alarm bit 154 is disabled (not masked), the alarm bit 154 contributes to causing an interrupt. One skilled in the pertinent art is familiar with interrupt mask registers and interrupt mask bits.

The next lowest level of registers (nodes) in the hierarchical register consolidation structure 100 contains function/channel-level interrupts 140. In the illustrated embodiment, the function/channel-level interrupts 140 are used to indicate the alarms or events on a function or channel basis. More specifically, the function/channel-level interrupts 140 consolidate the source-level interrupts 150 into interrupt status registers 141, 146, 147, 148, 149. Each of the interrupt status registers 141, 146, 147, 148, 149 is of a "read only" type of register and contains interrupt status bits that are a consolidation of the alarm bits within a particular alarm register. For example, if any of the alarm bits 152-156 of the alarm register 151 are in alarm condition and their associated interrupt mask bit is disabled, those alarm bits are consolidated into (or propagates to) an interrupt status bit 145 of the interrupt status register 141, which causes the interrupt status bit 145 to be set. In the illustrated embodiment, the interrupt status registers 141, 146, 147, 148, 149 may contain any number of interrupt status bits and can be grouped in any manner required. In addition, each of the interrupt status registers 141, 146, 147, 148, 149 has an associated interrupt mask register (not shown) that is used to prevent (mask) or allow their associated interrupt status bits to contribute to causing an interrupt.

The next higher level of registers in the hierarchical register consolidation structure 100 contains block-level interrupts 130, which, in the illustrated embodiment, are used to indicate the alarms or events on a block-level basis. The block-level interrupts 130 consolidate the function/channel-level interrupts 140 into interrupt status registers 131, 135, 136, 137. More specifically, each of the interrupt status registers 131, 135, 136, 137 of the block-level interrupts 130 contains interrupt status bits that are a consolidation of the interrupt status registers 141, 146, 147, 148, 149 of the function/channel-level interrupts 140. For example, if any of the interrupt status bits 142-145 of the interrupt status register 141 are in alarm condition (set) and their associated interrupt mask bit is disabled, those interrupt status bits are consolidated into (or propagates to) an interrupt status bit 132 of the interrupt status register 131, which causes the interrupt status bit 132 to be set. In addition, each of the interrupt status registers 131, 135, 136, 137 has an associated interrupt mask register (not shown) that is used to prevent (mask) or allow their associated interrupt status bits to contribute to causing an interrupt.

In the illustrated embodiment, the top level register (root) in the hierarchical register consolidation structure 100 contains a single chip-level interrupt register 120. The chip-level interrupt register 120 is similar to an interrupt status register and contains interrupt status bits 122-127. Each of the interrupt status bits 122-127 is a consolidation of their associated interrupt status registers 131, 135, 136, 137 of the block-level interrupts 130. For example, if any of the interrupt status bits 132-134 of the interrupt status register 131 are in alarm condition (set) and their associated interrupt mask bit is disabled, those interrupt status bits are consolidated into the interrupt status bit 122.

The chip-level interrupt register 120 also has an associated interrupt mask register (not shown) that individually determines if the interrupt status bits 122-127 may contribute to an interrupt. If any of the interrupt status bits 122-127 are in the alarm condition and their associated interrupt mask bit is disabled, an interrupt is asserted on the interrupt pin 110. If an interrupt is asserted on the interrupt pin 110, the processor employing the hierarchical register consolidation structure 100 will be interrupted. One skilled in the pertinent art should know that the hierarchical register consolidation structure 100 may have any number of layers and may have any number of interrupt status registers or alarm registers in their appropriate layers having any number of bits. Also, the associated functionality of each layer of the hierarchical register consolidation structure 100 may be different depending upon the implementation. In other embodiments, other types of registers may be employed in place of the alarm registers described above.

Figure 2:
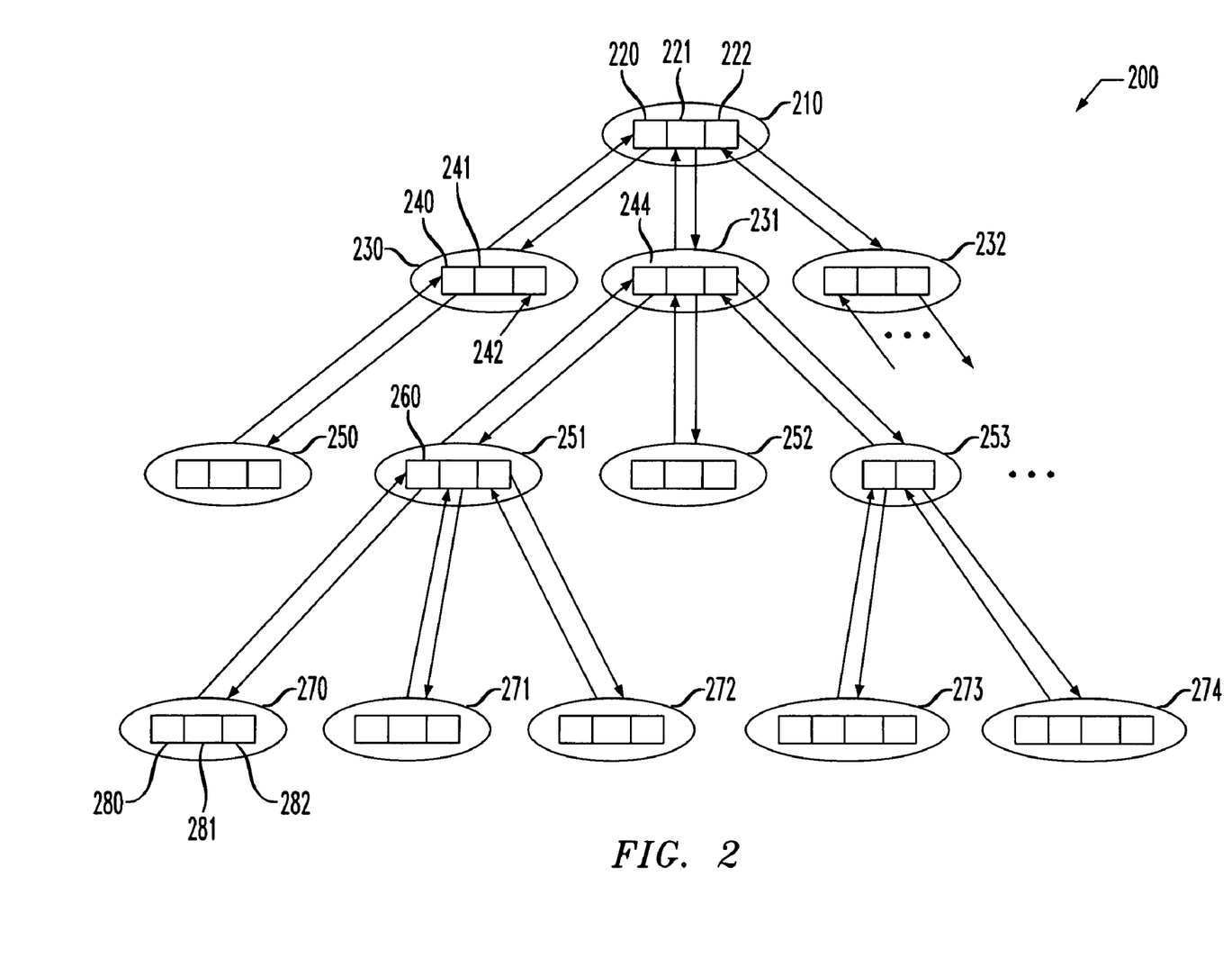
FIG. 2 illustrates a schematic diagram of an embodiment of a condition management structure constructed from the hierarchical register consolidation structure of FIG. 1 according to the principles of the present invention.

Turning now to FIG. 2, illustrated is a schematic diagram of an embodiment of a condition management structure, generally designated 200, constructed from the hierarchical register consolidation structure 100 of FIG. 1 according to the principles of the present invention. FIG. 2 is presented for the purpose of assisting one skilled in the pertinent art in understanding how the present invention cooperates with a condition management structure. The essential purpose of a condition management structure is to provide an efficient mechanism for traversing an interrupt hierarchy, ending in uniquely defined elements, each corresponding to a single condition capable of triggering an interrupt.

The condition management structure 200 is a data structure that is stored in memory associated with a processor and can be accessed by an application program being executed by the processor. The condition management structure 200 includes information to abstract groups of status indicators associated with a hierarchical register consolidation structure of the processor into a tree. See FIG. 1 for a description of a hierarchical register consolidation structure.

The structure of the condition management structure 200 includes two types of objects: container objects and element objects. Each of the container objects is associated with at least one element object and includes a parent link to a single parent object. Each of the element objects represents at least one of the status indicators in the hierarchical register consolidation structure. Also, each of the element objects includes a child link to a single child object. The container objects may include the element objects.

To simplify the discussion, the condition management structure 200 is illustrated and will be discussed in a simpler form. Accordingly, unless specifically indicated herein, the arrangement, linking and number of container objects and element objects illustrated are not limitations of the present invention.

The condition management structure 200 is similar to a tree structure, in that, the condition management structure 200 includes leaves, branches and a single root. The leaves of the condition management structure 200 are container objects 270-274. Each of the leaf container objects 270-274 may be associated with any number of element objects. For example, leaf container 270 is associated with three element objects 280-282. In the illustrated embodiment, the leaf container objects 270-274 are associated with the lowest level of registers, which contain a group of status indicators, in a hierarchical register consolidation structure, such as the alarm registers 151, 158 of the source-level interrupts 150 of FIG. 1. Also, each of the element objects 280-282 represents at least one status indicator within the lowest level of registers in the hierarchical register consolidation structure. For example, the element objects 280-282 may represent the alarm bits 152-154 of alarm register 151 of FIG. 1. Also, each of the element objects associated with the leaf container objects 270-274, such as element objects 280-282, has its child link to a child object unestablished (or set to NULL).

The element objects, such as element objects 280-282, may also include a unique name and a position of the status indicator(s) within a register of the hierarchical register consolidation structure. This allows the application software to locate the appropriate status indicator(s) and return its current state and unique name. The application software may also perform functions to the condition management structure 200 or its associated hierarchical register consolidation structure based on the unique name. In addition, each of the element objects may also include a container link to its associated container object. For example, each of the element objects 280-282 has a container link to its associated leaf container object 270. This allows for easier traversals up and through the condition management structure 200.

As stated previously, each of the container objects, including the leaf container objects 270-274, has a parent link to a single parent object. In the illustrated embodiment, the parent object is a consolidation element object associated with a hierarchically higher container object. For example, the parent object of the leaf container object 270 is a consolidation element object 260 of a container object 251. The consolidation element object 260 is the same as an element object, except that the consolidation element object 260 represents the consolidation of all of the element objects 280-282 of the leaf container object 270. The consolidation of element objects 280-282 to the consolidation element object 260 is similar to the consolidation of the alarm bits 152-156 into the interrupt status bit 145 of FIG. 1. As with an element object, the consolidation element object has a child link to a child object that is a hierarchically lower container object. In FIG. 2, the child object linked to the consolidation element object 260 is the leaf container object 270. This double linking advantageously allows for quick determination of status indicators and traversal up and down the condition management structure 200.

Each of the container objects, such as the leaf container objects 270-274, includes one or more addresses of its associated registers in the hierarchical register consolidation structure. Such a register address may be the alarm register address or a mask register address. The register address may also be a status register address.

Traversing up the condition management structure 200, the next higher hierarchical level includes container objects 250-253. Typically, the container objects 250-253 abstracts the groups of status indicators in the next hierarchically higher level of registers of the hierarchical register consolidation structure. For example, the container objects 250-253 may abstract the groups of status indicators in the function/channel-level interrupts 140 of FIG. 1. As illustrated in FIG. 2, this level in the condition management structure 200 may have branch container objects 251, 253 and leaf container object 250, 252. Branch container objects, in one embodiment, are associated with elements objects that are consolidation element objects that are linked to single child objects. The child objects are hierarchically lower container objects. For example, the branch container object 251 is associated with an element object 260 that has a child link to the leaf container object 270.

Typically, all leaf container objects are logically located at the lowest level of the condition management structure 200. However, the condition management structure may have leaf container objects at any level, such as leaf container objects 250, 252. The logical location of leaf container objects may depend upon the how the hierarchical register consolidation structure is organized. The logical location of leaf container objects may also depend upon if any of the hierarchically lower groups of status indicators may contribute to or propagate to any higher groups of status indicators. This advantageously allows the condition management structure 200 to be adapted to various types of hierarchical register consolidation structures.

The next hierarchically higher level of the condition management structure 200 includes branch container objects 230-232. Typically, the branch container objects 230-232 abstract the groups of status indicators in the next hierarchically higher level of registers of the hierarchical register consolidation structure. For example, the branch container objects 230-232 may abstract the groups of status indicators in the block-level interrupts 130 of FIG. 1. In a related embodiment, the branch container object 230 may be associated with a consolidation element object 240 having a child link to the container object 250 and element objects 241, 242 that do not have a child link to a child object established (or set to NULL) similar to the element objects 280, 281 of the leaf container object 270. Usually, all of the element objects associated with a container object either have a child link to a child object or do not have a child link to a child object established. This mixture of element objects allows the condition management structure 200 to be able to abstract various types of hierarchical register consolidation structures or have various logical configurations based upon specific requirements.

In FIG. 2, the root of the condition management structure 200 is a root container object 210. Since the root container object 210 is the root of the condition management structure 200, the root container object 210 does not have a parent link to a single parent object established (or set to NULL) and is the starting point for traversing the condition management structure 200. Associated with the root container object 210 are element objects 220-222. Typically, the root container object 210 represents the top level register in a hierarchical register consolidation structure and each of the element objects 220-222 represents a status indicator in the top level register. For example, the root container object 210 may represent the chip-level interrupt register 120 of FIG. 1 and the element objects 220-222 may represent the single interrupt status bits 122-124, respectively, of the chip-level interrupt register 120. The element objects 220-222 are also consolidation element objects for the container objects 230-232, respectively.

Figure 3:
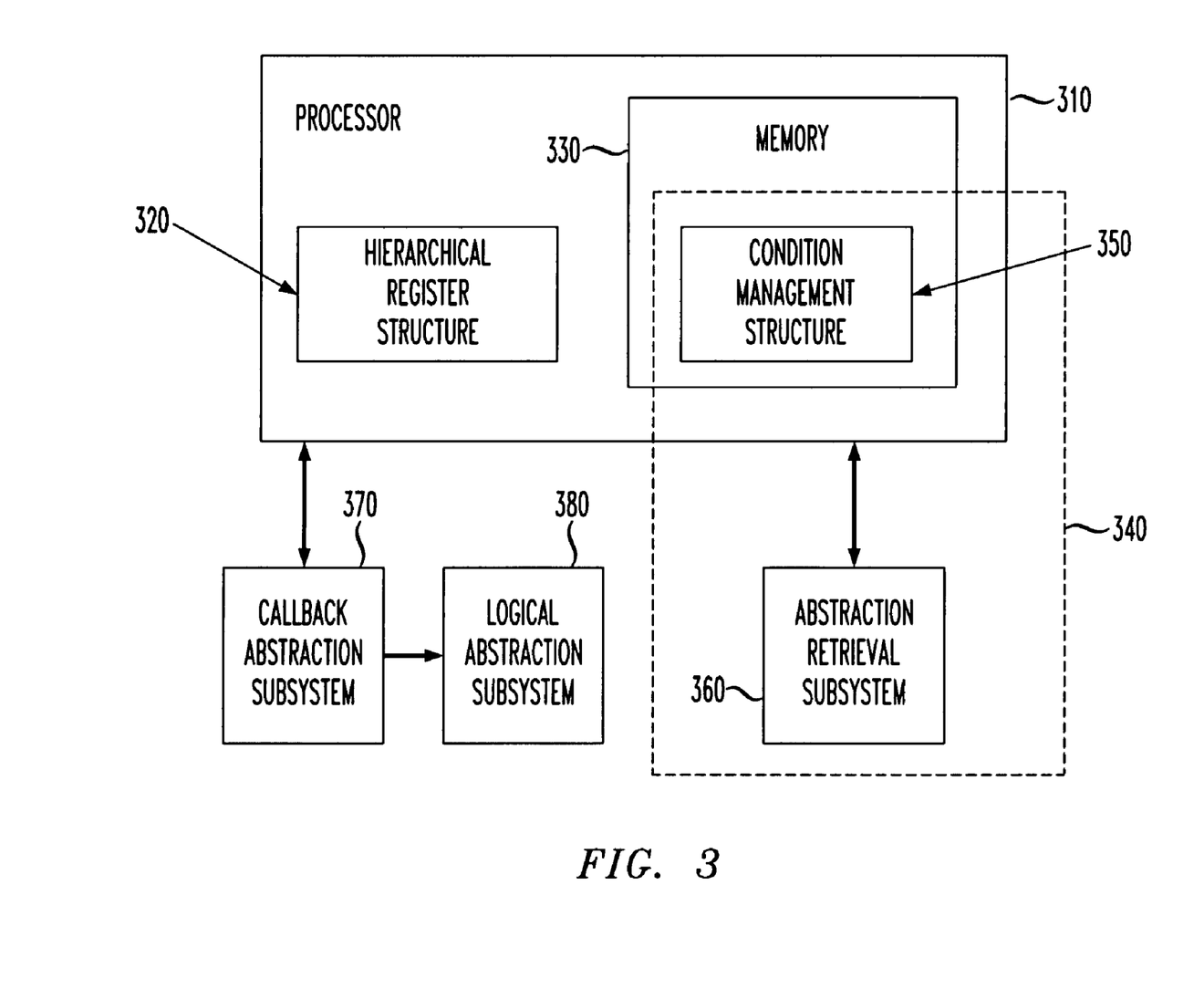
FIG. 3 illustrates a block diagram of a condition management callback system for use with a processor employing a hierarchical register consolidation structure and constructed according to the principles of the present invention.

Having introduced a condition management structure, a condition management callback system in conjunction with an embodiment of the present invention can be introduced in FIG. 3. The condition management system 340 may be employed with a conventional processor 310 having a hierarchical register consolidation structure 320 and memory 330. The processor 310 may be a microprocessor, an embedded processor, a communications processor, a network processor, such as a Synchronous Optical Network (SONET) processor, a microprocessor within an application-specific integrated circuit (ASIC) or any type of processor having some type of hierarchical register consolidation structure 320. The memory 330, in another embodiment, may include one type of memory located with the processor 310 and another type of memory located external to the processor. The hierarchical register consolidation structure 320, in one embodiment, may be similar to the hierarchical register consolidation structure 100 of FIG. 1. In another embodiment, the hierarchical register consolidation structure 320 may be a hierarchical interrupt register structure of the processor 310.

The condition management system 340, in the illustrated embodiment, includes a condition management structure 350. The condition management structure 350 abstracts groups of status indicators associated with the hierarchical register consolidation structure 320 into a tree of hierarchical container objects and element objects.

The condition management system 340, in one embodiment, also includes an abstraction retrieval subsystem 360. The abstraction retrieval subsystem 360 may be software, hardware, firmware, microcode or a combination thereof, and may be embodied within the processor 310, external to the processor 310 or a combination thereof. The abstraction retrieval subsystem 360 is configured to employ the condition management structure 350 to traverse the hierarchical register consolidation structure 320 to determine a condition of at least one of the status indicators of the hierarchical register consolidation structure 320. In one embodiment, the status indicators may be a single bit within a register of the hierarchical register consolidation structure 320, such as an alarm bit or an interrupt status bit. In a related embodiment, the abstraction retrieval subsystem 360 may also retrieve a unique name associated with the status indicator.

In one example, the hierarchical register consolidation structure 320 may be a hierarchical interrupt register structure and the abstraction retrieval subsystem 360 may employ the condition management structure 350 to abstract the hierarchical interrupt register structure. Given this, the abstraction retrieval subsystem 360 may recursively traverse the condition management structure 350 to determine which event/interrupt caused an interrupt. For example, if an event/interrupt occurred and the cause of the event/interrupt was an alarm bit represented by the element object 281 of the leaf container object 270 of FIG. 2. The abstraction retrieval subsystem 360, employing the condition management structure, first accesses the root container object 210 and determine which of the associated element objects 220-222 were set. In one embodiment, the abstraction retrieval subsystem 360 determines the appropriate element object by first reading the interrupt status register (not shown) associated with the root container object 210. The abstraction retrieval subsystem 360 then traverses each of the associated element objects 220-222 and employ the bit position of the element object's interrupt status bit (status indicator) to determine which interrupt status bit is in alarm condition. In this case, the interrupt status bit associated with the second element object 221 is in the alarm condition state.

The abstraction retrieval subsystem 360 may then employ the child link of the second element object 221 to obtain the branch container object 231 and its associated interrupt status register. In the procedure described above, the abstraction retrieval subsystem 360 determines that the element object 244 is associated with the interrupt status bit that is in the alarm condition at this level. The abstraction retrieval subsystem 360 may then employ the child link of the element object 244 to obtain the branch container object 251 and its associated interrupt status register. The abstraction retrieval subsystem 360 then determines, from the above procedures, that the element object 260 is associated with the interrupt status bit that is in the alarm condition.

The abstraction retrieval subsystem 360 then employs the child link of the element object 260 to obtain a leaf container object 270. Since the container object is a leaf container object, the abstraction retrieval subsystem 360 obtains the associated alarm register (or source register) from the hierarchical interrupt register structure 320. The abstraction retrieval subsystem 360 may also obtain a mask register associated with the alarm register from the hierarchical interrupt register structure 320. Employing the alarm register and possibly the mask register, the abstraction retrieval subsystem 360 may determine which of the element objects 280-282 is associated with an alarm bit that is in the alarm condition and if the alarm bit may contribute to causing an interrupt. In this example, the element object 281 is associated with an alarm bit that caused the interrupt. See FIGS. 1 and 2 for a discussion on interrupt mask registers and contributing to interrupts (propagation). The abstraction retrieval subsystem 360 then returns information indicating which alarm bit caused the interrupt. The abstraction retrieval subsystem 360 may, in a related embodiment, also return a unique name associated with that particular alarm bit. See Table 1, below, for exemplary code for recursively traversing the condition management structure 350 to determine the condition of one or more status indicators.

TABLE 1

Example Retrieval Code

```
Elem *getNextActiveElem(Node *upbnd, Elem *lastActiveElem){
    Elem *pElem = NULL;
    if (lastActiveElem == NULL){
        // This is the case which found the first Active
        // Elem under upbnd. Need to make sure the parent
        // of upbnd is Active, otherwise no active
        if (upbnd->parent == NULL){ // upbnd is the root
            _getRecActiveElem(upbnd);
        }else if (isElemActive(upbnd->parent)==true){
            _getRecActiveElem(upbnd);
        }
    }else{
        // First check if lastActiveElem is an offspring of
        // updng, otherwise return error
        pElem = lastActiveElem;
        while((pElem->container != upbnd) &&
            (pElem->container->parent != NULL)){
            pElem = pElem->container->parent;
        }
        if((pElem->container->parent == NULL) &&
            (pElem->container != upbnd)){
            return NULL; //Error
        }
        // Assume the lastActiveElem is an Active one,
        // So the parent of upbnd should be active from
        // hardware
        _getRecNextActiveElem(upbnd, lastActiveElem);
    }
    pElem = ActiveElem;
    ActiveElem = NULL;
    return pElem;
}
void _getRecActiveElem(Node *node){
    Elem *pElem;
    int mVal, aVal, sVal;
    // the following assures one register access for whole
    // node value
    if(node->elem->child == NULL){
        mVal = DEVREAD(node->mAddr);
        aVal = DEVREAD(node->aAddr);
    }else{
        sVal = DEVREAD(node->sAddr);
    }
    for (int i=0; (i<node->numOfMember)&&(ActiveElem==NULL);
        i++){
        pElem = &node->member[i];
        // Found the active Elem
        if (pElem->child == NULL){
            if (_getBitVal(aVal, pElem->pos) == true &&
                _getBitVal(mVal, pElem->pos) == true){
                ActiveElem = pElem;
                return;
            }
        }
        // Determine whether to go down further
        if (pElem->child != NULL &&
            _getBitVal(sVal, pElem->pos) == true){
            _getRecActiveElem(pElem->child);
        }
    }
}
void _getRecNextActiveElem(Node *upbnd, Elem *lastActiveElem){
    Elem *pElem;
    Node *pContainer;
```

TABLE 1-continued

Example Retrieval Code

```
    int offset, mVal, aVal, sVal;
    pContainer = lastActiveElem->container;
    offset = lastActiveElem - pContainer->elem;
    // The pointer difference between the specified start
    // with the first elem. Make sure at least the next
    // elem exists. Also there is no active elem children
    // under if the parent is not active
    while(pContainer != upbnd &&
        (offset == (pContainer->numOfMember - 1))){
        lastActiveElem = pContainer->parent;
        pContainer = lastActiveElem->container;
        offset = lastActiveElem - pContainer->elem;
    }
    // if this lastActiveElem is the last one on upbnd,
    // then no active elem found
    if (pContainer == upbnd && offset ==
        (pContainer->numOfMember -1)){
        return;       // no further active elem found,
                      // reach the upbound
    }
    // the following assumes one register access for
    // whole node value
    if(pContainer->elem->child == NULL){
        mVal = DEVREAD(pContainer->mAddr);
        aVal = DEVREAD(pContainer->aAddr);
    }else{
        sVal = DEVREAD(pContainer->sAddr);
    }
    // need to check ActiveElem here
    for (int i=offset + 1; (i<pContainer->numOfMember)&&
        (ActiveElem==NULL); i++){
        pElem = &pContainer->member[i];
        if (pElem->child == NULL){
            // Found the active Elem
            if (_getBitVal(aVal, pElem->pos) == true &&
                _getBitVal(mVal, pElem->pos) == true){
                ActiveElem = pElem;
                return;
            }
        }
        // Determine whether to go down further
        if (pElem->child != NULL &&
            _getBitVal(sVal, pElem->pos) == true){
            _getRecActiveElem(pElem->child);
        }
    }
    if (ActiveElem == NULL){
        //Active elem not found under this level
        if (pContainer == upbnd ){
            // if this happened in the upbnd node
            // no further active elem found, reached the
            // bound
            return;
        }else{      // go up one level, keep looking
            lastActiveElem = pContainer->parent;
            _getRecNextActiveElem(upbnd, lastActiveElem);
        }
    }
}
```

Referring back to FIG. 3, the abstraction retrieval subsystem 360, in one embodiment, is further configured to employ a mask to determine the condition of one or more status indicators that are represented by ones of the element objects associated with a leaf container object.

In the illustrated embodiment, the present invention introduces a callback abstraction subsystem 370 and a logical abstraction subsystem 380. The callback abstraction subsystem 370 is configured to register a callback for at least one element object in the condition management structure 350 and store logically abstracted data associated with the callback in the logical abstraction subsystem 380.

The callback abstraction subsystem 370 may be further configured to maintain parameters associated with the callback in the logical abstraction subsystem 380. One such parameter may be control information for automatic enabling and disabling of said callback.

In another embodiment, the callback abstraction subsystem 370 is further configured to set an auto-disable flag associated with the callback in the logical abstraction subsystem 380. In such case, the abstraction retrieval subsystem 360 is configured to employ the auto-disable flag to cause the callback to be disabled from being initiated again after a first initiation. In addition, the callback abstraction subsystem 370 may be further configured to register, in the logical abstraction subsystem 380, multiple callbacks for each one of the element objects and store logically abstracted data for each of the callbacks.

See Table 2, below, for exemplary code that defines a default interrupt handler that includes a callback function constructed according to the principles of the present invention.

TABLE 2

Default Interrupt Handler Including Callback Function

```
void ISR( )
{
    if (HandlePriorityInterrupts( ) == ABORT_HANDLING)
    {
        return;
    }
    AutoEnableCallbacks( );
    lastElement = NONE;
    while ((element =
GetNextActiveElement(TOP_NODE, lastElement)) != NONE)
    {
        InvokeCallback(element);
        lastElement = element;
    }
}
/* HandlePriorityInterrupts( ) services a priority queue */
void AutoEnableCallbacks( )
{
    for (each callback)
    {
        if (the callback's AutoEnable flag is set)
        {
            Enable the callback;
        }
    }
}
/* GetNextActiveElement( ) is from CMS */
void InvokeCallback(element)
{
    Identify the callback associated with element;
    if (the callback is registered and enabled)
    {
        Extract app_ptr and func_ptr from the callback data;
        Get app_ID and condition associated with element;
        Invoke func_ptr(app_ptr,app_ID,condition);
        if (the callback's AutoDisable flag is set)
        {
            Disable the callback;
        }
    }
}
```

The callback abstraction subsystem 370 advantageously provides an auto-enable feature. The auto-enable feature is the converse of the auto-disable feature described above and is used when an interrupt occurs to enable callbacks automatically. If the condition is handled during this interrupt or potentially over one or more interrupts following this one, it should no longer be contributing to the interrupt, making the auto-enable feature possible.

The logical abstraction subsystem 380 is used along with the callback abstraction subsystem 370. The logical abstraction system 380 maps each unique element in the condition tree with a set of logical data. The logical abstraction subsystem 380 also has its own sets of containers, which represent logical system entities (e.g., a SONET line). These may or may not have analogies in the condition tree. These containers each refer to a set of logical elements, each mapping to a unique element in the condition tree.

The present invention does not require or even expect a hierarchy to exist among the containers. Such a hierarchy could exist, but is irrelevant to the operation of the present invention. All that the present invention uses in its operation is a table of logical containers and a table of logical elements.

Each logical element refers to its logical container and maps directly to a condition tree element. This is advantageously done using the "element name" enumeration from CMS. Alternatively, the logical elements may be combined with the condition tree elements.

The logical elements advantageously contain both an application ID and a "condition" that is used in the callback, as per Table 2 above. In this context, "condition" is a logical abstraction, perhaps mapping to the bit position in a logical bitmap representation of the conditions for a particular entity. This information is stored in the logical element. Either a table indexed by "element name" contains the information and refers to the condition tree element, or the fields themselves are added to the condition tree element. It is not necessary to link these elements back to the logical containers, since the application can do this via the "application ID" if needed.

The logical abstraction subsystem 380 may be used to control interrupts. Operations on the logical elements map directly to CMS elements. Most interrupt operations are just straightforward mappings to CMS operations. When enabling interrupts, the enable should automatically propagate to their parents, then to their parents' parents, and so on, all the way to the top level. This way, interrupts can be controlled using only the logical abstraction, without referring to the underlying CMS or hardware abstractions.

When a callback is registered, enough logical information is stored to allow the callback object to make the callback using the same abstractions. This includes an identifier for the logical abstraction (which may be an "application ID") and something representing the condition in the context of that logical abstraction (the "condition" from Table 2 above). Thus, if the application registers a callback for alarm indication signal (AIS) or remote defect indication (RDI) conditions on SONET line A, a callback for an AIS condition would indicate [SONET line A] and [AIS].

Figure 4:
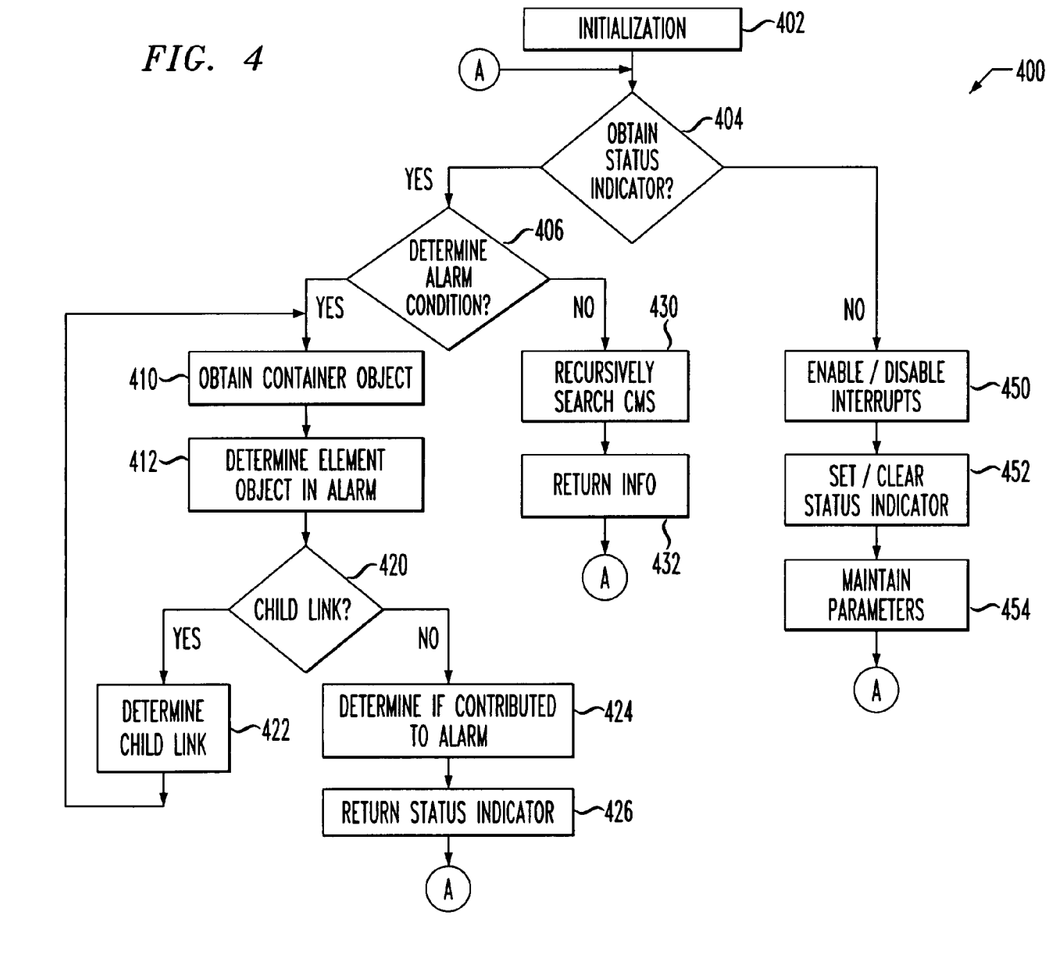
FIG. 4 illustrates a flow diagram of a condition management callback method for use with a processor employing a hierarchical register consolidation structure and carried out according to the principles of the present invention.

Turning now to FIG. 4, illustrated is a flow diagram of a condition management callback method for use with a processor employing a hierarchical register consolidation structure and carried out according to the principles of the present invention. In FIG. 4, the method 400 first performs initialization in a step 402.

After initialization, the method 400 determines whether or not it is to obtain a condition of a status indicator in a decisional step 404. If the method 400 is to obtain a condition of a status indicator, the method 400 then determines whether or not it is to determine which status indicator is in alarm condition in a decisional step 406. If the method is to determine which status indicator is in an alarm condition, the method 400 then employs a condition management structure to obtain the root container object in a step 410.

Next, the method 400 determines the element object that represents a status indicator that is in an alarm condition. See the discussion accompanying FIGS. 2 and 3, above, to review the manner in which it is determined which element object, associated with a container object, represents a status indicator in an alarm condition.

The method 400 then determines whether or not the element object found in the step 412 has a child link established in a decisional step 420. If the child link is established, the element object is not associated with a leaf container object and the method 400 then determines the child link in a step 422.

Next, the method 400 continues traversing down the condition management structure by obtaining the container object specified in the child link in the step 410. If the child link is not established, the element object found in the step 412 is associated with a leaf container object.

The method 400 then determines whether or not the status indicator represented by the element object found in the step 412 contributed to the alarm in a step 424. The method 400, in one embodiment, may employ a mask register to determine if the mask for the status indicator is disabled (not masked). If the mask for the status indicator is disabled, the status indicator contributed to the alarm. The method 400 then returns the condition of the status indicator in a step 426. The method 400 may also return a unique name associated with the status indicator. If the status indicator is masked, the method 400, in a related embodiment, may return to determine another element object that represents a status indicator that is also in the alarm condition in the step 412. (Not shown) The method 400 then returns to determine the type of processing to be performed in the decisional step 404.

If the method 400 determined that it was not to find a status indicator in an alarm condition in the decision step 406, the method 400 performs a query for a status indicator. The method 400 performs a query by recursively searching each container object and its associated element objects in the condition management structure in a step 430. See Table 1, above, for an example of code that recursively traverses the condition management structure.

Once the method 400 finds the desired query information, the method 400 returns the status indicator or any other associated information specified in the query in a step 432. At this point, any associated callback is initiated based on the condition. Thus, if the one of the element objects representing the at least one of the status indicators has a callback registered, the logically abstracted data is passed. Again, see Table 2, above, for exemplary code that defines a default interrupt handler that enables this functionality. The method 400 then returns to determine the type of processing to be performed in the decisional step 404.

If the method 400 determined that is not to obtain a condition of a status indicator in the decisional step 404, the method 400 may then employ the condition management structure to enable or disable interrupts for selected ones of the status indicators in the hierarchical register consolidation structure in a step 450.

Next, the method 400 may clear or set the status indicators in a step 452. The method 400 may also maintain parameters in the condition management structure that are associated with the status indicators in a step 454. During the step 454, callbacks for one or more of the element objects are registered and logically abstracted data associated with the callback is stored.

The method 400 may perform any of the steps 450, 452, 454 and in any order depending upon what is required. Also, the method 400 may employ recursive queries to find and modify the desired information or status indicators. The method 400 then returns to determine the type of processing to be performed in the decisional step 404.

One skilled in the art should know that the present invention is not limited to processing the types of information described above. Nor is the present invention limited to the exact decisional tests described above. Other embodiments of the present invention may employ different tests to determine what is to be performed or the order of execution. The present invention and method may also perform multiple functions at the same time. Also, other embodiments of the present invention may have additional or fewer steps than described above.

While the methods disclosed herein have been described and shown with reference to particular steps performed in a particular order, it will be understood that these steps may be combined, subdivided, or reordered to form an equivalent method without departing from the teachings of the present invention. Accordingly, unless specifically indicated herein, the order or the grouping of the steps are not limitations of the present invention.

From the above, it is apparent that the present invention introduces a way of logically abstracting an interrupt structure. This allows applications that need to interact with the interrupt structure to interact with a logical view of the structure, and frees the application of having to deal with the physical interrupt arrangement.

Although the present invention has been described in detail, those skilled in the art should understand that they can make various changes, substitutions and alterations herein without departing from the spirit and scope of the invention in its broadest form.

What is claimed is:

1. A condition management callback system embodied in a computer-readable media for use with a processor employing a hierarchical register consolidation structure, comprising:

a condition management data structure, separate from said hierarchical register consolidation structure, containing groups of status indicators logically abstracted directly from said hierarchical register consolidation structure into a tree of hierarchical container objects and element objects, each of said container objects associated with at least one of said element objects and linked to a single parent object, each of said element objects representing at least one of said status indicators and linked to a single child object, wherein if two groups of said status indicators consolidate to a single consolidation status indicator of said hierarchical register consolidation structure, one of said container objects being associated with said at least one of said element objects and a virtual element object, then said virtual element object is said parent object to one of said container objects associated with said element objects representing said status indicators of one of said two groups;

a callback abstraction subsystem configured to register a callback for one of said element object and store logically abstracted data associated with said callback; and an abstraction retrieval subsystem configured to employ said condition management structure to determine a condition of at least one of said status indicators by traversing said hierarchical register consolidation structure, initiate said callback based on said condition and pass said logically abstracted data if said one of said element objects representing said at least one of said status indicators has said callback registered.

2. The condition management callback system as recited in claim 1 wherein said callback abstraction subsystem is further configured to register said callback for at least one of said container objects.

3. The condition management callback system as recited in claim 2 wherein said abstraction retrieval subsystem is further configure to initiate said callback based on said element objects associated with said at least one of said container objects and pass said logically abstracted data.

4. The condition management callback system as recited in claim 1 wherein said logically abstracted data is a text message.

5. The condition management callback system as recited in claim 1 wherein said hierarchical register consolidation structure is a hierarchical interrupt register structure of said processor and said status indicators are interrupt bits of registers within said hierarchical register consolidation structure.

6. The condition management callback system as recited in claim 5 wherein said logically abstracted data contains information related to a type of interrupt.

7. The condition management callback system as recited in claim 1 wherein said callback includes a function pointer, an application data pointer and a callback state.

8. The condition management callback system as recited in claim 1 wherein said callback includes control information for automatic enabling and disabling of said callback.

9. The condition management callback system as recited in claim 1 wherein said callback abstraction subsystem is further configured to set an auto-disable flag associated with said callback and said abstraction retrieval subsystem is further configured to employ said auto-disable flag to cause said callback to be disabled from being initiated again after a first initiation.

10. The condition management callback system as recited in claim 1 wherein said callback abstraction subsystem is further configured to register multiple callbacks for said one of said element objects and store logically abstracted data for each of said callbacks.

11. A condition management callback method for use with a processor employing a hierarchical register consolidation structure, comprising:
abstracting groups of status indicators associated with said hierarchical register consolidation structure into a tree of hierarchical container objects and element objects to form a condition management data structure, separate from said hierarchical register consolidation structure, each of said container objects associated with at least one of said element objects and linked to a single parent object, each of said element objects representing at least one of said status indicators and linked to a single child object, wherein if two groups of said status indicators consolidate to a single consolidation status indicator of said hierarchical register consolidation structure, one of said container objects being associated with said at least one of said element objects and a virtual element object, then said virtual element object is said parent object to one of said container objects associated with said element objects representing said status indicators of one of said two groups;
registering a callback for one of said element objects;
storing logically abstracted data associated with said callback;
employing said condition management structure to determine a condition of at least one of said status indicators by traversing said hierarchical register consolidation structure;
initiating said callback based on said condition; and
passing said logically abstracted data if said one of said element objects representing said at least one of said status indicators has said callback registered.

12. The condition management callback system as recited in claim 11 wherein said registering comprises registering said callback for at least one of said container objects.

13. The condition management callback system as recited in claim 12 wherein said initiating comprises initiating said callback based on said element objects associated with said at least one of said container objects and pass said logically abstracted data.

14. The condition management callback system as recited in claim 11 wherein said logically abstracted data is a text message.

15. The condition management callback system as recited in claim 11 wherein said hierarchical register consolidation structure is a hierarchical interrupt register structure of said processor and said status indicators are interrupt bits of registers within said hierarchical register consolidation structure.

16. The condition management callback system as recited in claim 15 wherein said logically abstracted data contains information related to a type of interrupt.

17. The condition management callback system as recited in claim 11 wherein said callback includes a function pointer, an application data pointer and a callback state.

18. The condition management callback system as recited in claim 11 wherein said callback includes control information for automatic enabling and disabling of said callback.

19. The condition management callback system as recited in claim 11 wherein said abstracting comprises setting an auto-disable flag associated with said callback, said method further comprising employing said auto-disable flag to cause said callback to be disabled from being initiated again after a first initiation.

20. The condition management callback system as recited in claim 11 wherein said registering comprises registering multiple callbacks for said one of said element objects and store logically abstracted data for each of said callbacks.

* * * * *